July 4, 1933.   P. ROBINSON ET AL   1,916,586
ELECTROLYTIC DEVICE
Filed May 8, 1931
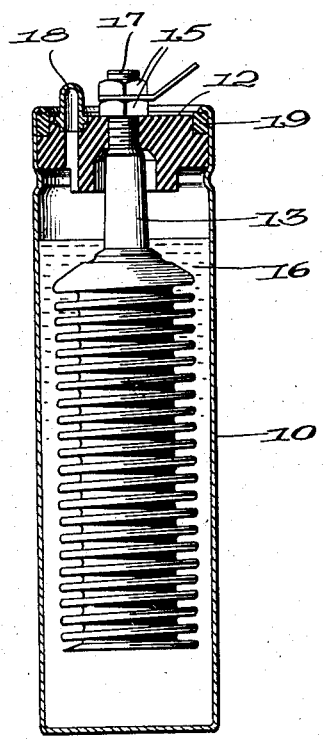
Inventors
Preston Robinson,
Joseph L. Collins,
By
Attorney Patented July 4, 1933

1,916,586

UNITED STATES PATENT OFFICE

PRESTON ROBINSON AND JOSEPH L. COLLINS, OF NORTH ADAMS, MASSACHUSETTS, ASSIGNORS TO SPRAGUE SPECIALTIES CO., OF NORTH ADAMS, MASSACHUSETTS, A CORPORATION OF MASSACHUSETTS

ELECTROLYTIC DEVICE

Application filed May 8, 1931. Serial No. 536,072.

Our invention relates to electrolytic devices such as electrolytic condensers, rectifiers and the like having film-forming electrodes, and more particularly to the electrolytes used in the formation of such electrodes and in the operation of such devices.

We shall describe our invention in connection with electrolytic condensers; however it should be well understood that it is not limited to such.

Electrolytic condensers, as it is well known in the art, comprise one or more electrodes of a metal exhibiting film-forming qualities. Such metals, for instance aluminum, when placed in a suitable electrolyte, upon application of the proper voltage, are covered by films of unidirectional characteristics.

In the early development of such devices it had been the practice to form the film on the electrodes after the assembly of the condensers; however, it has been found that it is advantageous to form the electrodes in a separate electrolyte and use a fresh electrolyte in the assembled condensers, such being shown for instance in U. S. Patent 979,906, to Fritz Weinberg. Formation of the electrodes in a separate electrolyte, reduces the possibilities of contamination of the electrolyte of the condenser, and in addition such procedure is more adapted for mass production.

The forming process therefore consists as a rule in placing the electrodes in a suitable forming tank, which is adapted to receive a large number of electrodes and which comprises the forming electrolyte. Mostly the forming tank constitutes one of the terminals of the forming cell, and the electrodes, connected in multiple, the other terminal.

The source of supply for the forming current, which is as a rule a D. C. generator, is connected to the two terminals and the voltage applied to the cell suitably regulated, either by adjusting the voltage of the generator or by variable resistors provided in the circuit. As the formation proceeds, the film builds up on the electrodes and increases the resistance of the cell.

Various schedules may be employed in the formation process, for instance, the formation may be started with gradually increasing voltages and the current maintained constant until the maximum desired forming voltage is reached. Then for a certain period this voltage is maintained constant, whereby the current decreases automatically as the film resistance increases.

Or the forming process may be carried out in steps, whereby the film is gradually built up to a certain voltage, the formation interrupted for a while, then resumed at a lower and carried through to a higher voltage than previously obtained, the formation again interrupted, and such cycle repeated with increasing voltages until the maximum desired forming voltage is obtained.

The maximum voltage allowable in formation for a given metal has been found to depend primarily on the composition of the electrolyte and its concentration. When this voltage is exceeded, persistent sparking takes place and the resistance of the cell decreases. This voltage is frequently referred to as the sparking voltage.

Not in all cases is formation carried to the sparking voltage and the maximum voltage to which formation is carried may be below the sparking voltage. However, as the phenomena and processes hereinafter described and the results obtained are equally applicable, whether the maximum forming voltage represents the sparking voltage or not, the expression "maximum voltage", hereinafter, should be understood to embrace both cases.

We have found that, irrespective of the exact schedule of formation, if electrodes are formed to a certain maximum voltage in the forming tank, and then assembled in a condenser using electrolyte of the same composition, the breakdown voltage of the condenser is lower than the maximum forming voltage because the electrolyte attacks the film in the assembled condenser.

We have found that the equilibrium between the film—which in case of aluminum electrodes consists of partly hydrated aluminum oxide—and the hydroxide ions will be affected if the hydroxide ions, under given voltage conditions, exceed a certain critical concentration. If the hydroxide concentration is kept below this critical value there is, in general, little or no effect on the film. The reaction between the two substances (in case the film-forming electrode is of aluminum) may be written as follows:

$$Al_2O_3 (film) + 2OH = 2\ AlO_2 + H_2O$$

This reaction is not reversible in this case, as water and aluminate ion in whatever concentration will not produce an aluminum oxide film of the desired character. Aluminate ions added to an electrolyte may, however, result in the formation of excess hydroxide ions and aluminum hydroxide. While these excess hydroxide ions will primarily attack the aluminum hydroxide which was formed through the above reaction, they will also attack the film, and the purpose of this invention is to prevent such attack.

In the co-pending application of P. Robinson, Serial No. 468,466, filed July 16, 1930, it was shown how through addition of aluminum hydroxide to the electrolyte prior to the assembly of the condenser, equilibrium in the above reaction was brought about and attack of the film thereby greatly reduced. The purpose of the present invention is to decrease the hydroxide ion concentration to equilibrium concentration or below by other methods and thus prevent or minimize attack of the film. The method of either the above referred to or the present application is sufficient to obtain satisfactory results. The best results, however, are obtained by utilizing both inventions.

One object of our invention is to prevent the electrolyte from attacking the film by an excess of hydroxide ions and to obtain condensers having a breakdown voltage of the same value as the maximum forming voltage of the electrodes used therein.

A further object of our invention is to obtain condensers which have a higher breakdown voltage than the maximum forming voltage of the electrodes used therein.

A further object of our invention is to obtain condensers, the breakdown voltage of which increases in operation.

A further object of our invention is to obtain condensers, the capacity of which increases in operation.

A further object of our invention is to obtain condensers, the power factor of which decreases in operation.

A further object of our invention is to form a plurality of electrodes at the same maximum forming voltage and utilizing such electrodes to obtain condensers having different breakdown voltages.

Other objects of our invention will appear as this specification progresses.

We shall illustrate our invention in the case of specific electrolytes and for given voltages. However, it should be well understood that such electrolytes and voltages are given merely as illustration without limiting our invention to such.

Among the various electrolytes used for electrolytic condensers, weak acids and salts of weak acids are found to be most suitable. Such acids are, for instance, boric acid, citric acid, malic acid, tartaric acid, phosphoric acid, hydrocyanic acid, etc., and the salts are salts of these acids, not necessarily of the same acids.

If electrodes are formed in an aqueous solution of borax and boric acid composed of 18 gallons of water, 13 pounds of boric acid, and 3 pounds 11 ounces of borax, the sparking voltage is about 430 volts. If such electrodes are used in a condenser having an electrolyte which is substantially the same as the initial forming electrolyte, the breakdown voltage of the condenser will be found to be only about 415 volts.

We have found that this is due to an excess of hydroxyl ions which attack the film and partly dissolve it, and that such dissolution of the film reduces the breakdown voltage.

We have also found that the pH of the forming electrolyte—which is the negative common logarithm of the hydrogen ion concentration of the electrolyte and which indicates the acidity or alkalinity of the electrolyte—decreases during formation, and accordingly the hydroxyl ion concentration is decreased.

In the above-mentioned case, for instance, the initial pH of the forming electrolyte is 6.0 (at 25° C.) and this pH is reduced to 5.5 (again at 25° C.) at the completion of the formation. An equilibrium, corresponding to this pH, is reached between the film and the electrolyte.

If an electrode is taken out from the forming tank in which the electrolyte has reached such equilibrium for a pH of 5.5 and placed in a condenser having an electrolyte of pH 6.0 (corresponding to the original pH of the forming electrolyte), there is an excess of hydroxyl ions over that demanded by the equilibrium and the film is attacked until equilibrium is reached.

We have now found that by adding, continuously or in steps, borax to the electrolyte in the form of solid salt or in concentrated solution in such a manner that the pH of the electrolyte is maintained at all times substantially at 6.0, and using the electrodes so formed in a condenser having an electrolyte of pH 6.0 the equilibrium is maintained at a constant value, no attack of the film takes place, and a breakdown voltage of about 430 volts is obtained for the condenser; the breakdown voltage thus being the same as the maximum forming voltage.

We have found furthermore that the breakdown voltage can be raised even above the maximum forming voltage by using in the condenser an electrolyte of lower pH than the pH of the forming electrolyte.

We have also found that such condensers, besides having a higher initial breakdown voltage than the maximum forming voltage, also exhibit other unexpected and highly desirable electrical characteristics, which are the following: The breakdown voltage does not decrease in operation, but shows a continued increase even if the condenser is operated at a voltage much below the maximum forming voltage. The capacity is greater than the capacity which would correspond to a condenser having an electrode formed at a maximum voltage equal to the breakdown voltage and further increases in operation. The power factor is smaller than the power factor which would correspond to a condenser having an electrode formed at a maximum voltage equal to the breakdown voltage and further decreases in operation. These unexpected improved characteristics are of evident advantage and exhibit trends opposite to those displayed in prior and contemporary electrolytic condensers.

The reasons for obtaining these improvements in the breakdown voltage and other characteristics of the condenser by the use in the condenser of an electrolyte of lower pH than that of the forming electrolyte, are not quite clearly understood; but we believe that there is a tendency toward a more favorable equilibrium which manifests itself firstly, by the initial increase in the breakdown voltage of the condenser, and secondly by the further increase of the breakdown voltage and other improvements of the characteristics of the condenser when it is in operation.

One explanation for this behavior apparently lies in the fact that the film-formed in a solution of high pH is less hydrated than a film formed or assembled in a solution of lower pH. Thus the film in operation in a solution of lower pH gradually becomes more hydrated. Since the dielectric constant of water is 80, and the dielectric constant of the film is about 12, the hydration of the film to a small extent would cause the capacity of the film to increase. At the same time, this hydration causes the breakdown voltage to be increased.

We have also found that the lower the pH of the electrolyte used in the condenser compared with the pH of the electrolyte used in formation, the greater the increase in breakdown voltage of the condenser. For instance, if electrodes are formed in an electrolyte of pH 6.0 to a maximum voltage of 430 volts and an electrolyte of pH 5.5 is used in the condenser, the condenser will exhibit an initial breakdown voltage of 460 volts, which breakdown voltage will increase in operation to about 485 volts. At the same time, the capacity will also increase in operation about 3 to 5 per cent, and the power factor decrease about 8 to 12 per cent.

With the same forming electrolyte and forming voltage and electrolytes of pH 5 and pH 4.5 used in the condenser, the initial breakdown voltages obtained are 490 volts and 520 volts respectively, while these voltages increase in operation to 515 and 535 volts respectively.

It should be well understood that the values above given are approximate as variations between the individual condenser takes place within the limits well-known in the art.

Besides obtaining improved condensers by using our invention, various other advantages are also inherent thereto. For instance, electrodes to be used for different types of condensers, having different breakdown voltages, can be formed simultaneously to the same maximum forming voltage. This reduces the initial outlay for the forming equipment and simplifies and reduces the cost of formation.

Further savings can be obtained in formation by the use of a high pH electrolyte which could not be obtained previously for the following reasons:

From the standpoint of formation, an electrolyte of high pH is advantageous because for the same type of electrolyte the higher the pH, the higher the conductivity of the electrolyte, and the smaller the power losses in formation. On the other hand, the sparking voltage decreases with increased conductivity of the electrolyte. Thus, when the same electrolyte is used in the condenser as in formation the breakdown voltage of the condenser would be affected by the use of a high conductivity electrolyte.

Therefore, in the past the formation has taken place in electrolytes having a conductivity less than that desirable for efficient formation. By using our invention, the advantage of a high conductivity in formation can be used without affecting the breakdown voltage of the condenser.

In the above referred to application of P. Robinson a process has been described whereby an excess of material of the same constituency as the film is added in the form of a solid, or preferably in the form of a hydrous gelatinous precipitate and/or the same addition is made to the electrolyte of the condenser.

By this method attack of the film is greatly reduced. However, it is preferred to combine the present invention with the invention of the above referred to application, whereby attack of the film is altogether eliminated.

In the drawing forming part of this specification the single figure is a partly sectionized view of an electrolytic condenser embodying our invention.

The container 10 forms one of the electrodes of the condenser, and may be of film-forming or non-filming metal. The electrolyte 16 is for instance, an aqueous solution of borax and boric acid having a pH of 5.5.

Immersed in the electrolyte 16 is a second electrode 13 of film-forming metal, for instance, of aluminum, shown as a corrugated tube, although other forms of electrodes may be used. The electrode is covered with an electrolytically formed film, the formation of which took place in an electrolyte, consisting for instance, of an aqueous solution of borax and boric acid having a pH of 6.0, the maximum forming voltage being for instance 430 volts.

The container is closed by a cover 12 of insulating material through which projects a threaded extension 17 of the electrode 13, said extension being provided with nuts 15—15 to form one of the out-side terminals of the condenser, the container forming the other terminal.

The cover is provided with a vent 18, and a peripheral gasket 19, around which the free end of the container is crimped. Preferably, sealing means (not shown) are also provided between the protruding end of the electrode 13 and the cover 12.

The condenser having a filmed electrode formed as above stated, and provided with an electrolyte of the above character will exhibit an initial break-down voltage of about 460 volts, which break-down voltage will increase in operation to about 485 volts.

While we have described our invention in connection with borax and boric acid, it should be well understood that other weak acids or salts of weak acids, for instance, citric acid, phosphoric acid, malic acid, hydrocyanic acid, and salts of any of these acids can be used either as the first or second electrolyte, and the salt need not be the salt of the same acid, nor need the condenser be of the so-called "wet type", as the second electrolyte may be viscous or substantially dry.

It should also be well understood that while we have illustrated our invention for an electrolytic condenser, we do not wish to be limited to such devices nor in any other way, but desire the appended claims to be construed as broad as permissible in view of the prior art.

What we claim therefore to be new and desire to secure by Letters Patent is:

1. In the manufacture of film-forming electrodes for electrolytic devices having an electrolyte with a pH between 4 and 8, the process which comprises maintaining the electrolyte at a substantially constant pH during the whole formation process.

2. In the manufacture of film-forming electrodes for electrolytic devices, the process which comprises immersing film-forming electrodes in an electrolyte comprising boric acid and borax and adding to the electrolyte during formation borax in such quantities that the pH of the electrolyte is maintained substantially constant during the whole formation process.

3. In the manufacture of film-forming electrodes for electrolytic devices, the process which comprises forming an electrode in an electrolyte and adding a solid salt to the electrolyte in proper quantities and proper time intervals to maintain the pH of the electrolyte constant during the whole formation process.

4. In the manufacture of film-forming electrodes for electrolytic devices having an electrolyte with a pH between 4 and 8, the process which comprises forming an electrode in an electrolyte and adding a concentrated solution to the electrolyte in proper quantities and proper time intervals to maintain the pH of the electrolyte constant during the whole formation process.

5. In the manufacture of electrolytic condensers with film-forming electrodes, the process which comprises forming the electrode in an electrolyte and assembling the electrode into a condenser having an electrolyte of lower pH than the forming electrolyte.

6. In the manufacture of electrolytic condensers with aluminum electrodes, the process which comprises forming the electrode in an electrolyte and assembling the electrode into a condenser having an electrolyte of lower pH than the forming electrolyte.

7. In the manufacture of electrolytic condensers with aluminum electrodes, the process which comprises forming the electrode in an electrolyte comprising borax and boric acid and assembling the electrode into a condenser having an electrolyte of borax and boric acid of lower pH than the forming electrolyte.

8. In the manufacture of electrolytic condensers with film-forming electrodes, the process which comprises forming the electrode in an electrolyte, and assembling the electrode into a condenser having an electrolyte of lower pH and lower conductivity than the forming electrolyte.

9. In the manufacture of electrolytic devices with aluminum electrodes and having an electrolyte with a pH between 4 and 8, the process which comprises forming the electrode in an electrolyte, maintaining the electrolyte at a substantially constant pH during the whole formation process and assembling the electrode into a condenser having an electrolyte of lower pH than the forming electrolyte.

10. In the manufacture of electrolytic condensers with film-forming electrodes and having an electrolyte with a pH between 4 and 8, the process which comprises forming the electrodes in an electrolyte, maintaining the hydroxide concentration of the electrolyte at a substantiallyy constant value during formation and assembling the electrode into a condenser having an electrolyte, the hydroxide concentration of which is lower than that of the forming electrolyte.

11. In the manufacture of electrolytic devices, the process which comprises forming a plurality of electrodes in a common electrolyte and at the same maximum forming voltage and assembling said electrodes in condensers having electrolytes of different pH whereby condensers of different breakdown voltages are obtained.

12. In the manufacture of electrolytic condensers, the process which comprises forming a plurality of electrodes in an electrolyte and assembling said electrodes into condensers having different electrolytes of lower pH than the forming electrolyte, said condensers having breakdown voltages depending on the difference of the pH between the first and second electrolyte.

13. In the manufacture of electrolytic condensers, the process which comprises forming a plurality of electrodes in a common electrolyte and at the same maximum voltage and assembling the individual electrodes in condensers each having an electrolyte of different pH, the pH values of all electrolytes being lower than that of the forming electrolyte, said condensers having different breakdown voltages which are all higher than the maximum forming voltage of the electrodes.

14. An electrolytic condenser having an electrode of film-forming metal and an electrolyte within which said electrode extends, said electrolyte having a lower pH than the electrolyte in which said electrode was formed.

15. An electrolytic condenser with film-forming electrodes having an initial breakdown voltage greater than the forming voltage of said electrode comprising an electrolyte of a lower pH than the electrolyte in which the film is formed, said breakdown voltage increasing in the operation of the condenser.

16. An electrolytic condenser with film-forming electrodes comprising an electrolyte of a lower pH than the electrolyte in which the film is formed, the capacity of which increases and the power factor of which decreases during the operation of the condenser.

17. An electrolytic condenser with film-forming electrodes comprising an electrolyte of a lower pH than the electrolyte in which the film is formed, the breakdown voltage and capacity of which increase and the power factor of which decrease in the operation of the condenser.

18. In the manufacture of electrolytic devices, the process which comprises immersing a film-forming electrode in a forming electrolyte and assembling the electrode into a condenser having an electrolyte of lower pH than the forming electrolyte, said second electrolyte also comprising a substance of the same constituency as the film.

19. In the manufacture of electrolytic condensers, with aluminum electrodes, the process which comprises forming the electrode in an electrolyte maintaining the electrolyte at a substantially constant pH during the whole formation process, assembling said electrode into a condenser having an electrolyte comprising a gelatinous precipitate of aluminum hydroxide and having a lower pH than the forming electrolyte.

20. In the manufacture of electrolytic condensers with film-forming electrodes, the process which comprises forming the electrode in an electrolyte having a pH between 4 and 8 and assembling the electrode into a condenser having an electrolyte of lower pH than the forming electrolyte.

21. In the manufacture of electrolytic condensers with aluminum electrodes, the process which comprises forming the electrode in an electrolyte having a pH between 4 and 8 and assembling the electrode into a condenser having an electrolyte of lower pH than the forming electrolyte.

North Adams, Massachusetts, May 2nd, 1931.

PRESTON ROBINSON.
JOSEPH L. COLLINS.

DISCLAIMER 1,916,586.—*Preston Robinson* and *Joseph L. Collins*, North Adams, Mass. ELECTROLYTIC DEVICE. Patent dated July 4, 1933. Disclaimer filed March 30, 1934, by the assignee, *Sprague Specialties Company*.

Hereby enters this disclaimer to those parts of certain claims in such specification which are in the following words to wit:

"5. In the manufacture of electrolytic condensers with film-forming electrodes, the process which comprises forming the electrode in an electrolyte and assembling the electrode into a condenser having an electrolyte of lower pH than the forming electrolyte.

"6. In the manufacture of electrolytic condensers with aluminum electrodes, the process which comprises forming the electrode in an electrolyte and assembling the electrode into a condenser having an electrolyte of lower pH than the forming electrolyte.

"7. In the manufacture of electrolytic condensers with aluminum electrodes, the process which comprises forming the electrode in an electrolyte comprising borax and boric acid and assembling the electrode into a condenser having an electrolyte of borax and boric acid of lower pH than the forming electrolyte.

"8. In the manufacture of electrolytic condensers with film-forming electrodes, the process which comprises forming the electrode in an electrolyte, and assembling the electrode into a condenser having an electrolyte of lower pH and lower conductivity than the forming electrolyte."

"14. An electrolytic condenser having an electrode of film-forming metal and an electrolyte within which said electrode extends, said electrolyte having a lower pH than the electrolyte in which said electrode was formed.

"15. An electrolytic condenser with film-forming electrodes having an initial breakdown voltage greater than the forming voltage of said electrode comprising an electrolyte of a lower pH than the electrolyte in which the film is formed, said breakdown voltage increasing in the operation of the condenser.

"16. An electrolytic condenser with film-forming electrodes comprising an electrolyte of a lower pH than the electrolyte in which the film is formed, the capacity of which increases and the power factor of which decreases during the operation of the condenser.

"17. An electrolytic condenser with film-forming electrodes comprising an electrolyte of a lower pH than the electrolyte in which the film is formed, the breakdown voltage and capacity of which increase and the power factor of which decrease in the operation of the condenser.

"18. In the manufacture of electrolytic devices, the process which comprises immersing a film-forming electrode in a forming electrolyte and assembling the electrode into a condenser having an electrolyte of lower pH than the forming electrolyte, said second electrolyte also comprising a substance of the same constituency as the film."

"20. In the manufacture of electrolytic condensers with film-forming electrodes, the process which comprises forming the electrode in an electrolyte having a pH between 4 and 8 and assembling the electrode into a condenser having an electrolyte of lower pH than the forming electrolyte.

"21. In the manufacture of electrolytic condensers with aluminum electrodes, the process which comprises forming the electrode in an electrolyte having a pH between 4 and 8 and assembling the electrode into a condenser having an electrolyte of lower pH than the forming electrolyte."

except where the words "lower pH" in said claims are restricted to "a lower pH" of at least .5.

[*Official Gazette April 24, 1934.*]